United States Patent [19]

Ohtaka et al.

[11] Patent Number: 5,392,129

[45] Date of Patent: Feb. 21, 1995

[54] DIGITAL VCR SIGNAL PROCESSING APPARATUS FOR CONCEALING UNCORRECTABLE ERRORS

[75] Inventors: Hideki Ohtaka, Neyagawa; Tatsuro Juri, Osaka, both of Japan

[73] Assignee: Matsushita Electric Industrial Co., Ltd., Osaka, Japan

[21] Appl. No.: 83,052

[22] Filed: Jun. 25, 1993

[30] Foreign Application Priority Data

Jun. 25, 1992 [JP] Japan .................. 4-167200

[51] Int. Cl.⁶ ............................................. H04N 5/94
[52] U.S. Cl. .................. 358/336; 360/38.1; 360/53
[58] Field of Search ............... 358/314, 310, 335, 336, 358/37, 166; 360/53, 48, 33.1, 38.1, 35.1; 348/607, 606, 616; H04N 5/76, 5/78, 5/781, 5/782, 5/783, 9/79, 9/64, 5/14, 5/208, 9/88, 5/92

[56] References Cited

U.S. PATENT DOCUMENTS

| | | | |
|---|---|---|---|
| 4,489,351 | 12/1984 | d'Alayer de Costemore d'Arc | 358/335 |
| 4,586,082 | 4/1986 | Wilkinson . | |
| 5,012,361 | 4/1991 | Chiba et al. | 360/38.1 |
| 5,032,927 | 7/1991 | Watanabe et al. | 358/12 |
| 5,126,853 | 6/1992 | Mashimo et al. | 360/38.1 |
| 5,142,380 | 8/1992 | Sakagami et al. | 358/909 |
| 5,142,537 | 8/1992 | Kutner et al. | 360/38.1 |
| 5,181,125 | 1/1993 | Kawakami | 360/38.1 |
| 5,193,010 | 3/1993 | Juri et al. | 360/38.1 |

FOREIGN PATENT DOCUMENTS

| | | |
|---|---|---|
| 0203773 | 12/1986 | European Pat. Off. . |
| 0470772 | 2/1992 | European Pat. Off. . |
| 0471580 | 2/1992 | European Pat. Off. . |
| 0517141 | 12/1992 | European Pat. Off. . |
| 0527611 | 2/1993 | European Pat. Off. . |
| 0546691 | 6/1993 | European Pat. Off. . |
| 4-271071 | 9/1992 | Japan . |
| 5-114251 | 5/1993 | Japan . |

OTHER PUBLICATIONS

C. Yamamitsu et al., "An Experimental Study For A Home-Use Digital VTR", *IEEE Transactions on Consumer Electronics*, vol. 35, No. 3, pp. 450-457 (Aug. 1989).
C. Yamamitsu et al., "A Study on Trick Plays for Digital VCR", *IEEE Transactions on Consumer Electronics*, vol. 37, No. 3, pp. 261-265 (Aug. 1991).
E. Takakura et al., "A Study on the Reproduced Picture Quality in the Variable Speed Mode of the Digital VCR", *The Journal of the Institute of Television Engineers of Japan (Television Gakkaishi) Technical Report*, vol. 16, No. 35, pp. 7-12 (Jun. 1992).

*Primary Examiner*—Tommy P. Chin
*Assistant Examiner*—Thai Tran
*Attorney, Agent, or Firm*—Ratner & Prestia

[57] ABSTRACT

A signal processing apparatus for use in a digital video signal reproducing apparatus for reproducing digital signal presented in sync blocks is disclosed. Each sync block has a fixed area for low frequency data and five subsequent sync blocks define a sharing group for sharing high frequency data. The signal processing apparatus includes an inner and outer correction circuit for correcting errors in the sync blocks. An error flag is provided to a sync block which still has an error remaining after the processing in the correction circuit. A memory is provided for storing errorless sync blocks of one frame. A substitution switch is provided for passing the errorless sync blocks, but substituting a sync block stored in the memory for a sync block still having some errors. Five sync blocks produced from the substitution switch are held in a delay. When no substitute sync block is detected in the five sync blocks in the delay, the data in the five sync blocks are decoded by a bit rate reduction decoder. But, when one to four substitute sync block is detected in the five sync blocks in the delay, only the low frequency data of the five sync blocks in the fixed area are decoded by the bit rate reduction decoder.

7 Claims, 11 Drawing Sheets

NEW DATA (◎:DEFECT)　　　　MEMO 106

| | | | | | | | | |
|---|---|---|---|---|---|---|---|---|
| 1n | 0 | 0 | LOW ◎ | HIGH | 1(n-1) | 0 | 0 | LOW | HIGH |

DEFECT

| 2n | 0 | 0 | LOW ◎ | HIGH | 2(n-1) | 0 | 0 | LOW | HIGH |

HIGH

| 3n | 0 | 0 | LOW | ◎ | 3(n-1) | 0 | 0 | LOW | HIGH |
| 4n | 0 | 0 | LOW◎ | HIGH | 4(n-1) | 0 | 0 | LOW | HIGH |
| 5n | 0 | 0 | LOW ◎ | HIGH | 5(n-1) | 0 | 0 | LOW | HIGH |

122 OUT

CONCEALMENT FLAG　　HIGH FREQ TRIM FLAG

| 1(n-1) | 1 | 0 | LOW | HIGH |
| 2(n-1) | 1 | 0 | LOW | HIGH |
| 3(n-1) | 1 | 0 | LOW | HIGH |
| 4(n-1) | 1 | 0 | LOW | HIGH |
| 5(n-1) | 1 | 0 | LOW | HIGH |

FIG. 8c

DIGITAL VCR SIGNAL PROCESSING APPARATUS FOR CONCEALING UNCORRECTABLE ERRORS

BACKGROUND OF THE INVENTION

1. Field of the Invention

The present invention relates to a signal processing apparatus for concealing uncorrectable errors during signal reproduction in a digital signal recording and reproducing apparatus for digitizing a video signal and recording and reproducing the digitized signal.

2. Description of the Prior Art

Digital VCRs, which record and reproduce a digitized video signal to achieve significantly better image quality in consumer-class video devices, are widely expected to replace today's analog VCRs as the next generation in video components. One of the greatest advantages of the digital VCR is the nearly total absence of signal deterioration through multiple generations of dubbing and editing, and digital VCRs are already used in broadcasting and other commercial applications. To achieve a long playing time in a compact cassette, however, requires the efficient reduction of the image data by means of bit rate reduction processing. The structure and operation of a digital VCR using bit rate reduction is described briefly below.

The first step during recording is to convert the input video signal to a digital signal using an analog/digital (A/D) converter, after which the signal is compressed to a predetermined data quantity by a bit rate reduction encoder. The discrete cosine transformation (DCT) method is widely used for bit rate reduction or video signals because of the compression efficiency of the method. In the DCT method plural pixels are grouped into blocks, and the blocks are then converted to a frequency domain. The data can be efficiently compressed by variable length coding according to the converted coefficient. The encoding efficiency can be increased in this case by increasing the length of the variable length coding units. Doing so, however, also increases the range of error propagation when an error occurs. A coding method whereby variable length coding is applied with plural block units ("compression blocks" below) has been proposed in Japanese patent application number 1989-147891 for use in a digital VCR with a higher error probability than other transmission paths.

Error correction parity is then added by the error correction encoder, and a synchronization signal and identification data (ID) are added to create recording blocks ("sync blocks" below). The signal is then modulated for recording and the data is recorded to tape.

These sync blocks include the synchronization signal "sync" for detecting the sync blocks from the reproduced signal, the track number for correctly writing the reproduced sync block to memory, the sync block number and/or other identification information (ID), the video signal in a bit rate reduction form, and error correction parity (inner parity) data. These sync blocks are then aligned with the track and recorded to tape.

During signal reproduction, the sync blocks are detected from the signal reproduced by the playback head and demodulated, and error correction is applied by the error correction decoder based on the error correction parity added during recording. Any uncorrectable errors are then concealed in the bit rate reduced state by the error concealment processor.

The error correction process can correct up to a certain number of errors. When the tape is scratched or otherwise damaged, resulting in significant signal dropout, however, the amount of errors exceeds the correction capability of the process, and error correction becomes impossible. When such uncorrectable errors occur, concealment is used so that the effect of the errors is not visually conspicuous. Because the effect of these errors is propagated through the completed range of variable length coding, concealment is achieved by the error concealment processor substituting a previous corresponding sync block for the complete sync block containing the compression block in which the error is found. The concealed data is then decoded to the original data by the bit rate reduction decoder, converted to an analog signal by the D/A converter, and output.

The following problems are inherent in the above process and apparatus.

In digital VCRs that do not use bit rate reduction for broadcasting and other commercial applications, errors are concealed by interpolation of the error pixels from the surrounding pixels, or by substituting the corresponding pixel from the previous field. When bit rate reduction by an orthogonal transform or other block unit is used, a single error affects the complete block, and it is therefore difficult to conceal errors by interpolation from surrounding pixel level data. Concealment must therefore rely on substituting a complete block from the preceding field.

Such substitution successfully conceals errors without the viewer noticing the concealed blocks in still image areas, but the loss of correlation between fields in image areas with much movement results in a loss of continuity between the concealed block and the surrounding blocks. The viewer perceives this as noticeable image deterioration. When bit rate reduction is applied in plural field units to increase the coding efficiency, deterioration caused by concealment becomes an even greater problem because the concealed block is replaced by a block from several fields earlier.

SUMMARY OF THE INVENTION

Therefore, an object of the present invention is to minimize visually discernible image deterioration in a digital VCR using bit rate reduction coding by means of error concealment, and to enable error concealment using a small-scale circuit by concealment in a bit rate reduction state.

To achieve this object, according to the present invention, a signal processing apparatus for use in a digital video signal reproducing apparatus reproduces digital signal presented in sync blocks each having a LOW REGION area and HIGH REGION area and an N (N is a positive integer) number of subsequent sync blocks defining a sharing group for sharing HIGH REGION areas for storing high frequency data. According to the present invention, the signal processing apparatus comprises, error correction means for correcting errors in said sync blocks; error flag providing means for providing an error flag to a sync block which still has an error remaining after the processing in said error correction means and for selecting an errorless sync block which has no error; memory means for storing errorless sync blocks of one frame; substitution means for passing said errorless sync block and for substituting a sync block stored in said memory means for a sync block having an error flag; holding means for holding said N number of sync blocks produced from said substitution means; substitution detection means for detecting a presence of at least one to (N−1) substitute sync block in said N sync blocks stored in said holding means; and HIGH REGION area trimming means for passing without any change said N sync blocks produced from said holding means when no substitute sync block is detected, but for trimming the HIGH REGION area from each of said N sync blocks produced from said holding means when one to (N−1) substitute sync block is detected by said substitution detection means.

BRIEF DESCRIPTION OF THE DRAWINGS

The present invention will become more fully understood from the detailed description given below and the accompanying diagrams wherein.

DETAILED DESCRIPTION OF THE PREFERRED EMBODIMENTS

Figure 1:
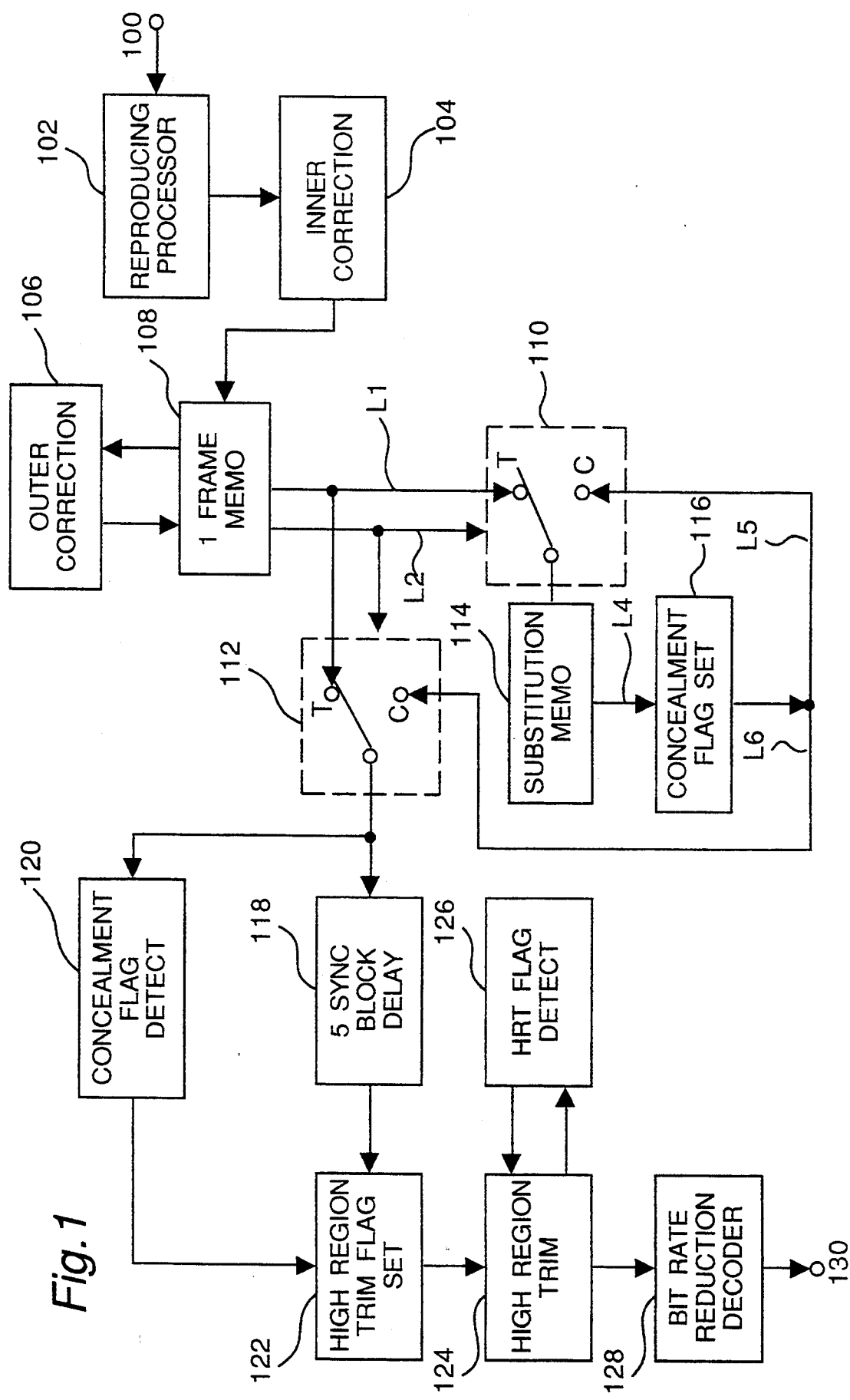
FIG. 1 is a block diagram of a signal processing apparatus for a digital video signal reproducing apparatus according to the present invention.

FIG. 1 is a block diagram of a reproducing portion of a digital VCR, particularly showing a signal processing apparatus for a digital video signal reproducing apparatus according to the present invention.

Before the description of the embodiment of the present invention shown in FIG. 1 proceeds, the recording portion of the digital VCR will be explained first in connection with FIGS. 2 to 5.

Figure 2:
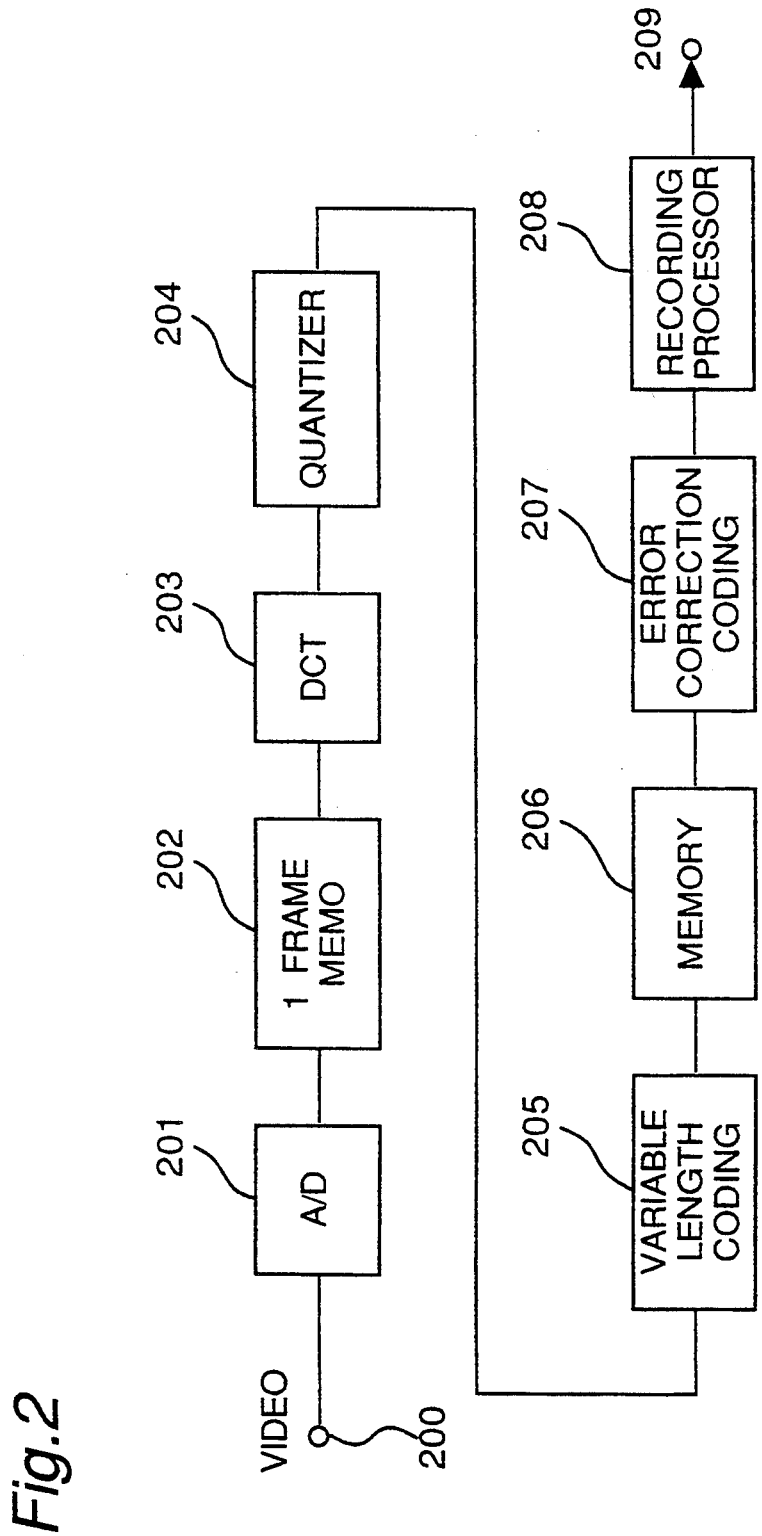
FIG. 2 is a block diagram of the bit rate reduction encoder used in a digital video signal recording apparatus.

Referring to FIG. 2, a block diagram of the bit rate reduction encoder provided in a recording portion of a digital VCR is shown. The bit rate reduction encoder comprises an input 200 for receiving an analog video signal, an A/D converter 201, a one frame memory 202 for storing digital video signal of one frame, a discrete cosine transformation (DCT) operator 203 for performing the discrete cosine transformation operation, a quantizer 204, a variable length coding encoder 205, a memory 206 for inserting the variable length coded data to sync blocks, an error correction coding encoder 207 for adding inner error correction codes, outer error correction codes and other necessary codes such as sync code and ID code, a recording processor 208 for presenting sync blocks ready to be recorded on a magnetic tape, and an output 209 for outputting the sync blocks to a recording head (not shown) for recording on a recording tape.

The digital video signal from A/D converter 201 is written to the one frame memory 202 accommodating one frame of the digital video signal. One frame memory 202 is diagrammatically shown in FIG. 3a.

Figure 3A:
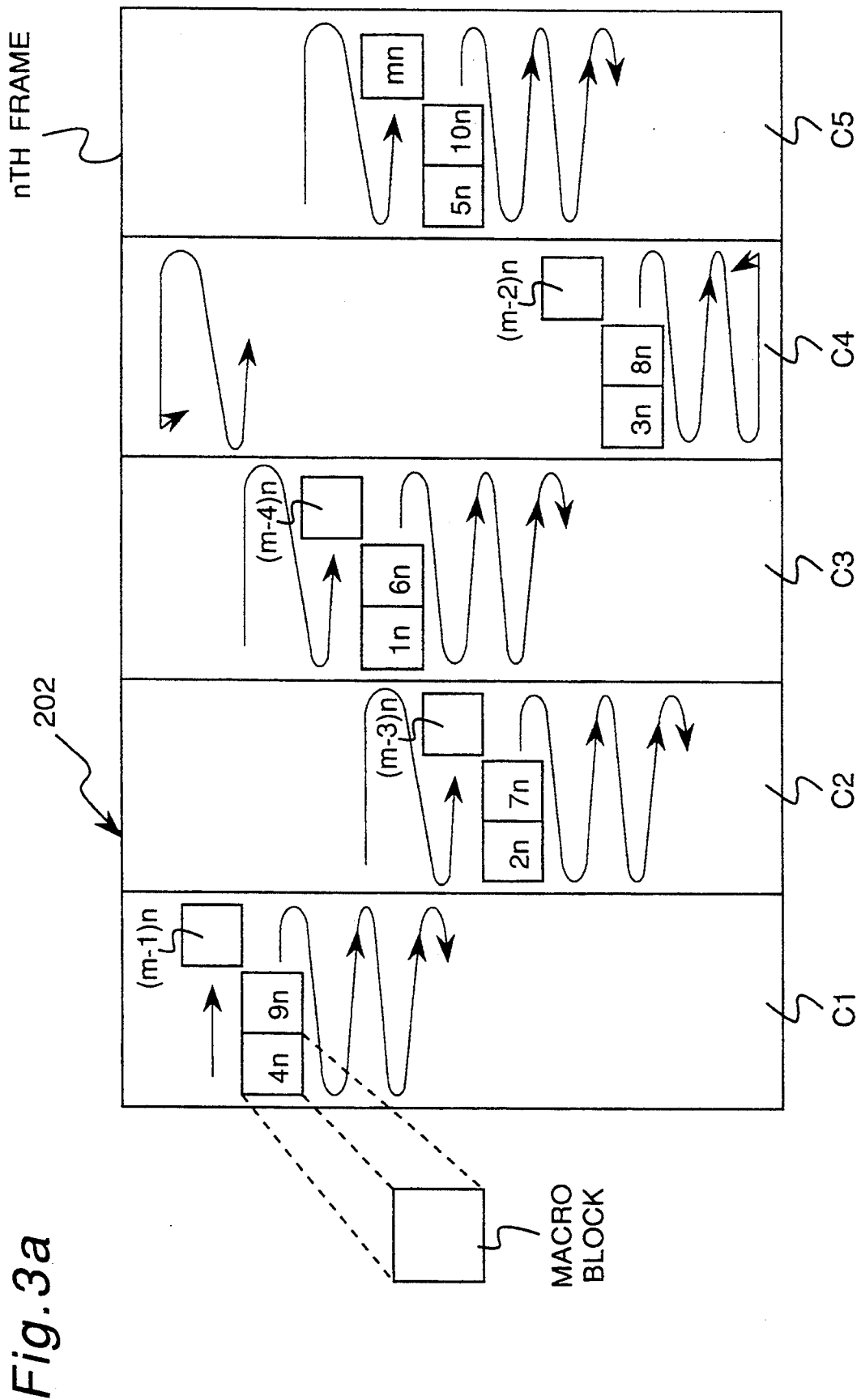
FIGS. 3a and 3b are diagrams showing the steps for reading the macro blocks and producing five sync blocks in one sharing group.

As shown in FIG. 3a, memory 202 carrying n-th frame data is divided into five columns C1, C2, C3, C4 and C5. From a preselected point in each of five columns C1, C2, C3, C4 and C5, a block data covering 64 pixels (8 pixels×8 lines) is extracted to provide five macro blocks 1n, 2n, 3n, 4n and 5n.

According to the preferred embodiment, the extraction is carried out such that from each macro block four brightness signal sub-blocks and two color difference signal sub-blocks (one R-Y sub-block and one B-Y sub-block) are read. Each compression that will be carried out DCT operation thus comprises thirty (30) sub-blocks. The input video signal is thus a 4:2:2 component signal, and the color difference signals are sampled every other line.

Figure 3B:
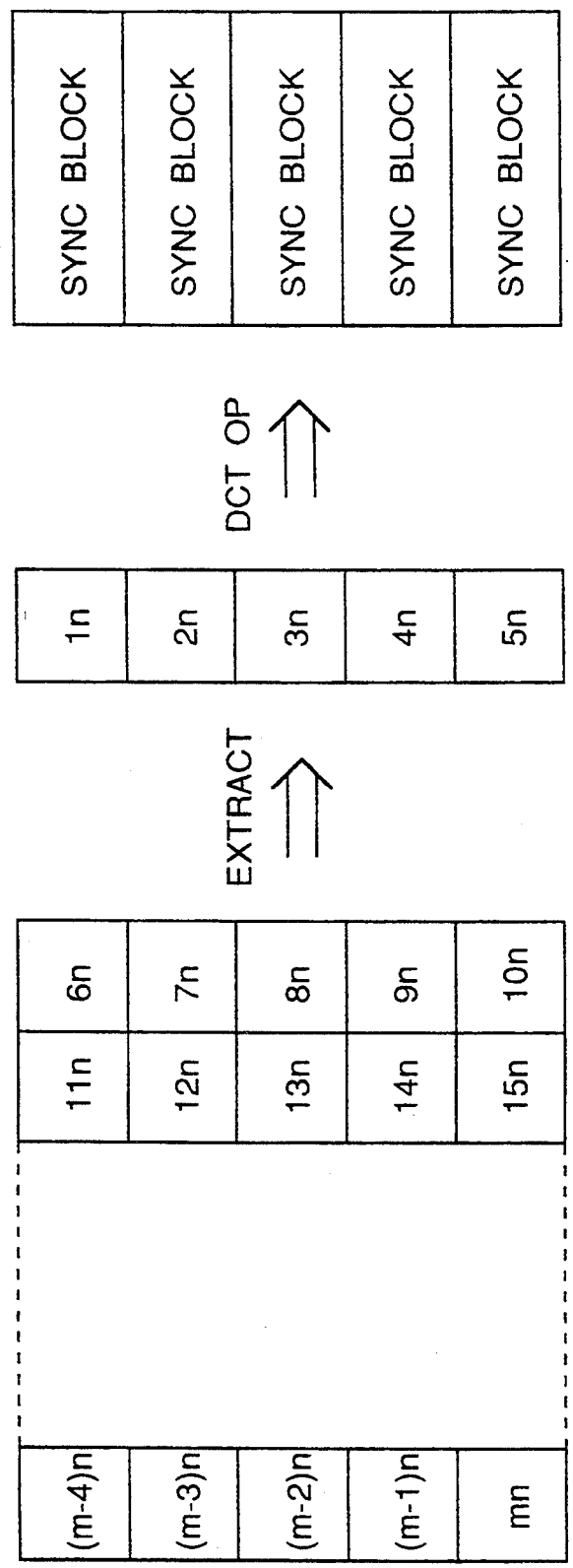

As diagrammatically shown in FIG. 3b, each of the five extracted macro blocks 1n, 2n, 3n, 4n and 5n is then processed in DCT operator 203, quantizer 204, variable length coding encoder 205, memory 206 and error correction coding encoder 207 to present five sync blocks 1n, 2n, 3n, 4n and 5n. After producing the five sync blocks 1n-5n, next five macro blocks 6n-10n, located adjacent to the previous macro blocks 1n-5n, are processed to produce another five sync blocks 6n-10n. This operation is repeated until final five macro blocks (m−4)n, (m−3)n, (m−2)n, (m−1)n and mn are changed to five sync blocks. Thereafter, video data of (n+1)-th frame is processed.

In the DCT operator 203, quantizer 204, variable length coding encoder 205, memory 6 and error correction coding encoder 207, the following operations are carried out for five macro blocks, such as 1n-5n, to provide five sync blocks.

Figure 4:
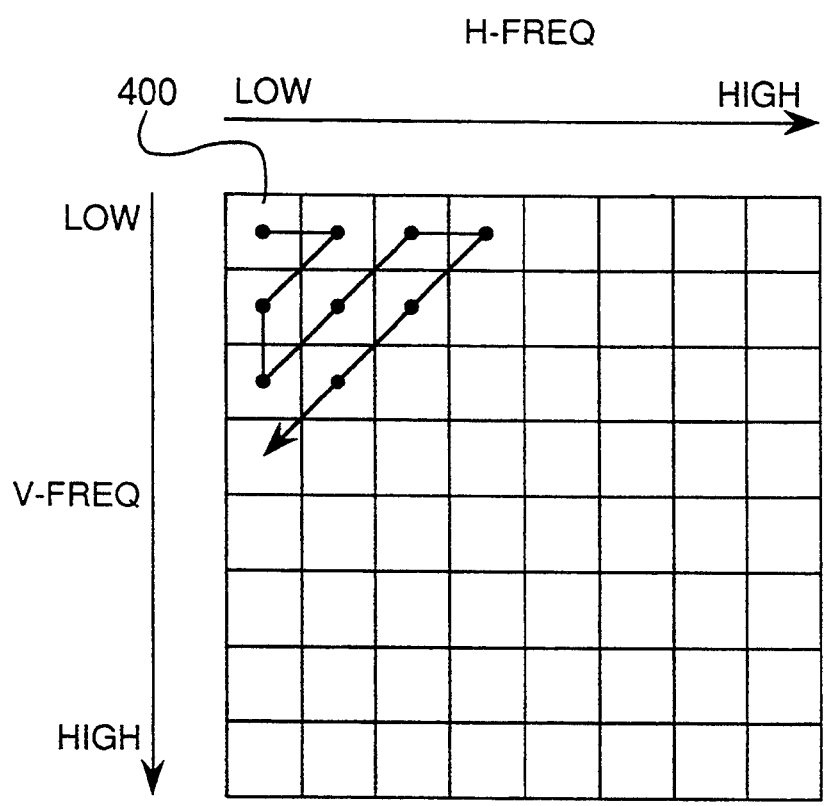
FIG. 4 is a diagram showing the sequence for reading the variable length coding coefficients obtained by DCT calculation.

The data from one block is converted by DCT operation to obtain frequency components analyzed in horizontal and vertical directions, and the DCT converted result will be plotted on 8×8 graph, as shown in FIG. 4, so that each box in 8×8 graph will carry amount of frequency component analyzed by the DCT operation.

In FIG. 4, the DC component will be stored in box 400, and the AC components will be stored in other boxes, such that higher the frequency, further away from box 400 the storing box will be.

For example, if the image in the block is a portion of a black sheet having no mark but plain black, DCT converted data will have only DC component. Thus, the DCT converted data will be given only in box 400, and all the remaining boxes will carry "0s".

If the image in the block is a portion of vertical narrow black and white stripes, DCT converted data will have low frequency components in the vertical analyzed direction, but low and high frequency components in the horizontal analyzed direction. Thus, the DCT converted data will be plotted in the boxes of the upper first to several rows in the 8×8 graph, and the remaining boxes will carry "0s".

Similarly, if the image in the block is a portion of horizontal narrow stripes, DCT converted data will have low frequency components in the horizontal analyzed direction, but low and high frequency components in the vertical analyzed direction. Thus, the DCT converted data will be plotted in the boxes of the first to several columns from the left side in the 8×8 graph, and the remaining boxes will carry "0s".

Furthermore, if the image in the block is a portion of a checkerboard pattern with tiny squares, DCT converted data will have low and high frequency components in both vertical and horizontal directions. Thus, the DCT converted data will be plotted in almost all the boxes in the 8×8 graph.

When reading the data in the 8×8 graph, the reading starts from the DC component in box 400 and proceeds in a zigzag pattern from the low frequency component to high frequency component, as shown by an arrow in FIG. 4. The read data will be stored in memory 206.

Figure 5A:
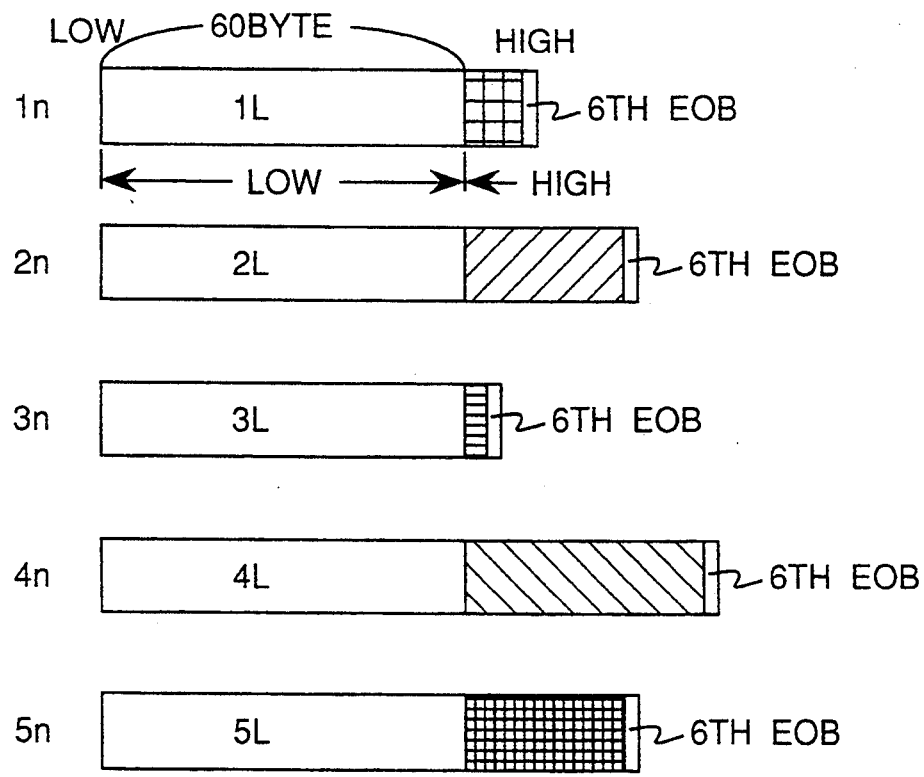
FIGS. 5a and 5b are diagrams showing the steps for making five sync blocks from the variable length coded data.

In FIG. 5a, an example of read data for five macro blocks 1n, 2n, 3n, 4n and 5n is shown. Note that some data are longer than other data. However, quantization is controlled by quantizer 204 so that total length of five variable length coded data for five macro blocks is always a constant, such as 385 (77×5) bytes including information of quantization and other information, such as two reset flags (0,0) at the beginning of sync block. In each macro block, a predetermined amount of data, such as 60 byte data, from the lowest frequency data is defined as a LOW FREQUENCY data, and the data exceeding the 60 byte data is defined as a HIGH FREQUENCY data.

Figure 5B:
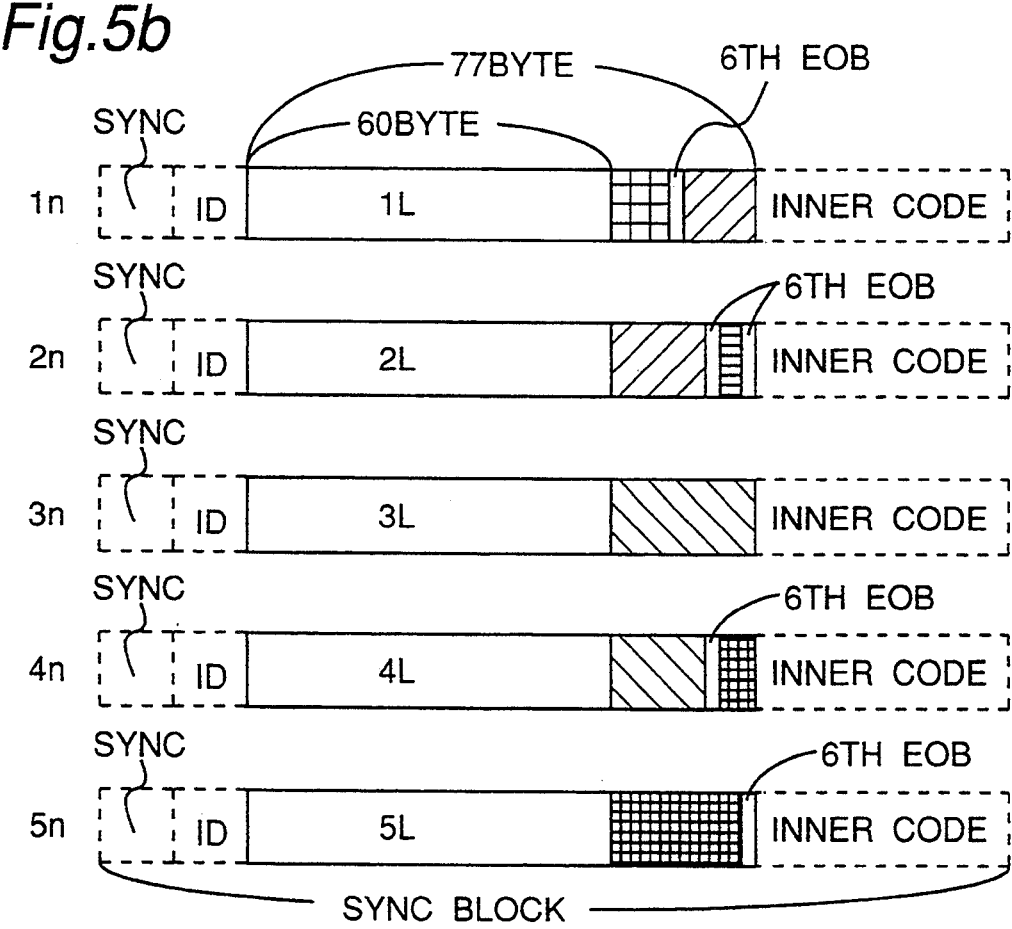

In memory 206, the data for five macro blocks 1n, 2n, 3n, 4n and 5n are rearranged such that the LOW FREQUENCY data 1L, 2L, 3L, 4L and 5L are maintained the same, but the HIGH FREQUENCY data are sequentially shifted, as shown in FIG. 5b, to make each macro block equal to 77 bytes. Therefore, some macro block may carry HIGH FREQUENCY data which belongs to other sync block. Also, all the HIGH FREQUENCY data for these five macro blocks can be found within the same five sync blocks. Thus, these five macro blocks are mutually sharing the HIGH FREQUENCY area for the HIGH FREQUENCY data, and are called five macro blocks of a sharing group.

Then, in the error correction coding encoder 207, as shown in FIG. 5b, inner codes for inner parity and outer codes for outer parity are added and sync signal and ID code are added in recording processors 208 to each macro block to produce a sync block.

Similar to the five macro blocks, the five sync blocks which share the HIGH FREQUENCY area for the HIGH FREQUENCY data are called five sync blocks of a sharing group.

From recording processor 208, the sync blocks are sequentially outputted through the output 209, so that the sync blocks are sequentially recorded on a recording tape.

A detail of making sync blocks from variable length coded data is disclosed in ITEJ Technical Report Vol. 16 No. 35 pp. 7-12, VIR 92-30 (June 1992) titled "A Study on the Reproduced Picture Quality in the Variable Speed Mode of the Digital VCR" by Eiichi TAKAKURA et al., which is herein incorporated by reference.

Referring now to FIG. 1, a reproducing portion of a digital VCR, particularly showing a signal processing apparatus for a digital video signal reproducing apparatus according to the present invention is shown. The signal processing apparatus comprises an input 100 for receiving sync blocks from magnetic tape, a reproducing processor 102 for separately producing each sync block, an inner correction decoder 104 for effecting an inner correction such as by inner parity by the inner code added in the error correction coding encoder 207, a memory 108 for storing one frame data consisting of plural sync blocks and also for storing error flags for respective sync blocks, as shown in FIG. 6, and an outer correction decoder 106 for effecting an outer correction such as by outer parity.

Figure 6:
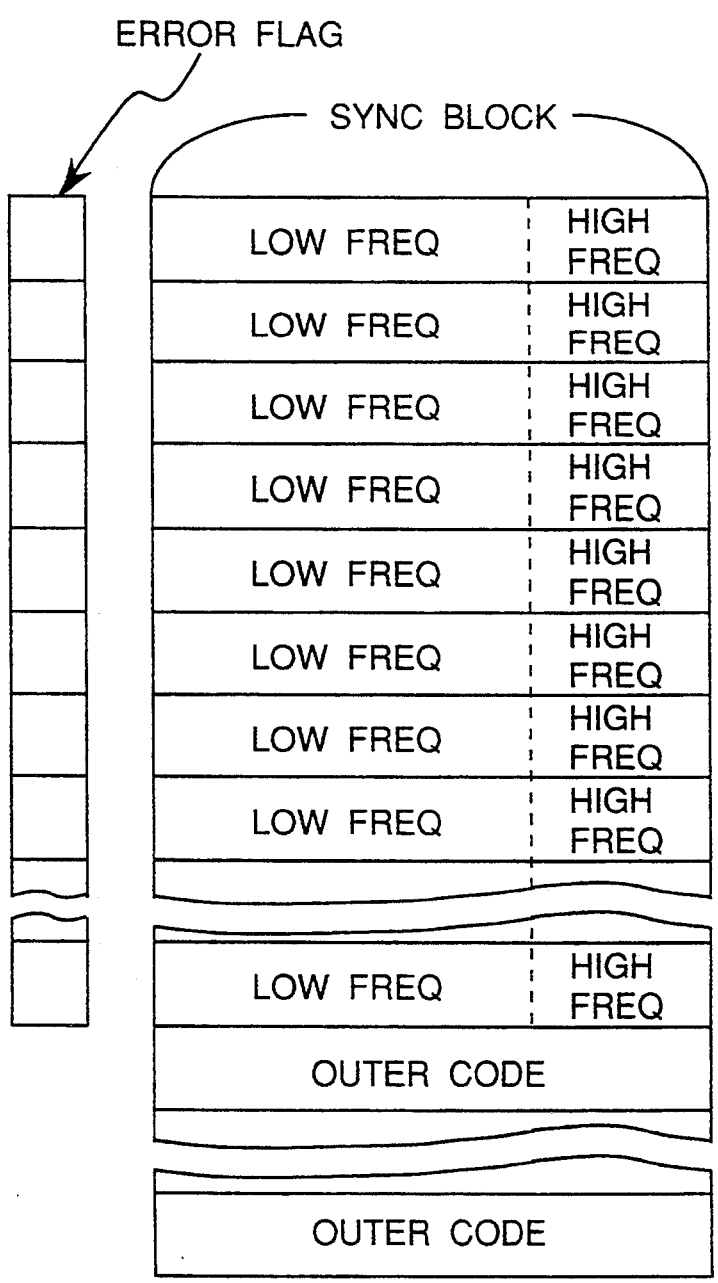
FIG. 6 is a diagram showing the layout of sync blocks stored in the one frame memory shown in FIG. 1.

As shown in FIG. 6, memory 108 stores the sync blocks in parallel to each other and some errors found in the sync blocks are corrected by inner codes and outer codes. However, if the errors are more than that can be corrected by the inner and outer codes, an error flag is set to "1" to the sync block which still has some errors. The sync block with no error has an error flag reset to "0".

The detail of the inner and outer corrections are disclosed in IEEE Transaction on Consumer Electronics, Vol., 35, No. 3, August 1989, titled "AN EXPERIMENTAL STUDY FOR A HOME-USE DIGITAL VTR" by C. YAMAMITSU et al., which is herein incorporated by reference.

Figure 8A:
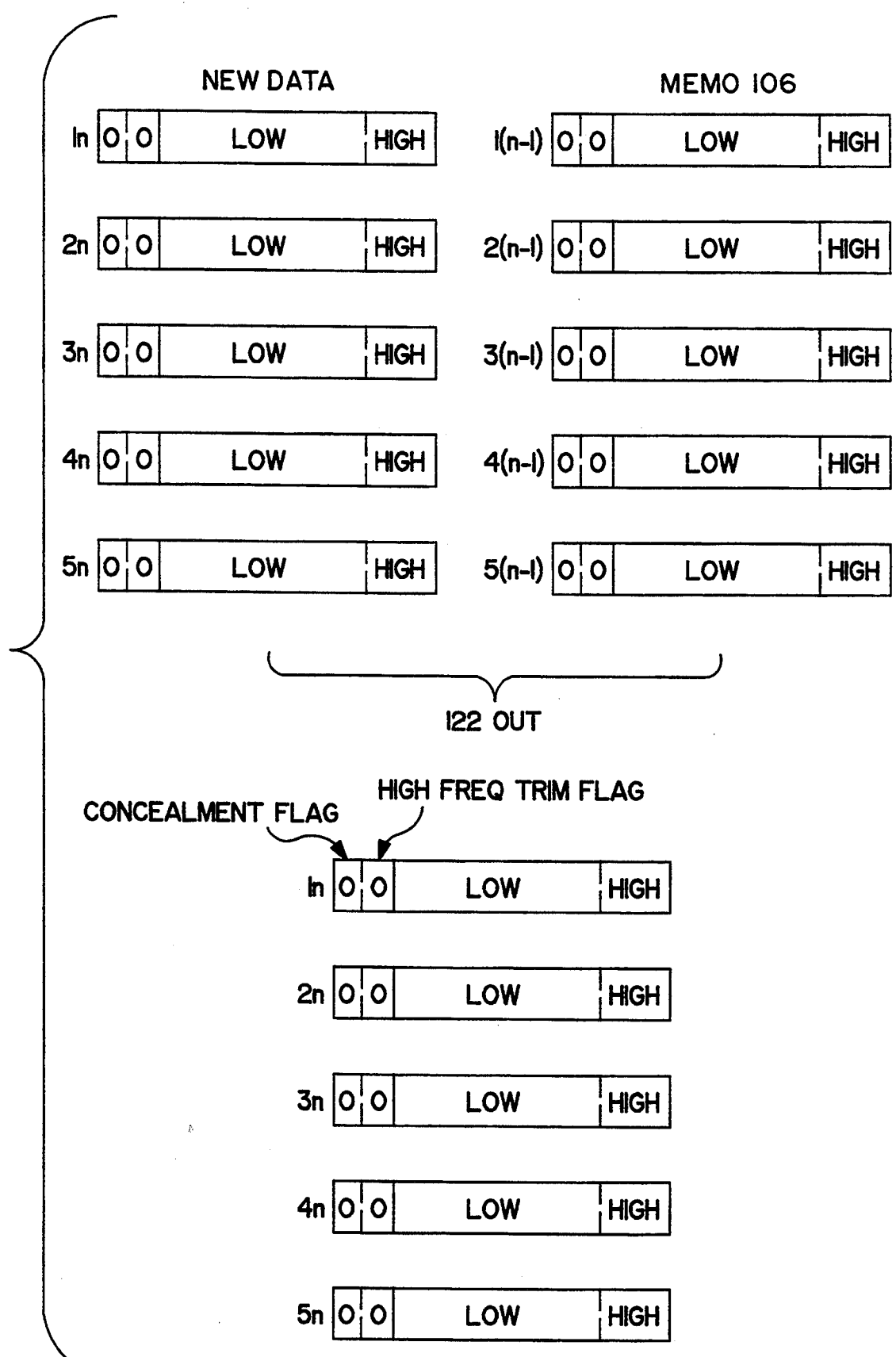

After the error correction and error flag setting in the memory 108 are done, inner codes and outer codes are removed. The two bit areas at the beginning of each block are used for recording two reset flags (0, 0): one for a concealment flag; and the other for a HIGH FREQUENCY trim flag (HRT flag), which will be described later. Thus, the sync blocks with two reset flags (0, 0), sync signal, ID code, LOW FREQUENCY data and HIGH FREQUENCY data, such as shown in FIG. 8a, are sequentially produced along line L1 to both switches 110 and 112, particularly to their terminal T. In parallel to the sync blocks, error flags are also sequentially produced along line L2 to both switches 110 and 112 to control the switching position between terminals T and C.

When the error flag is "0" indicating that the corresponding sync block has no error, switches 110 and 112 are switched to terminal T in the position shown in FIG. 1. In this case, the sync block with no error is transmitted to a substitution memory 114 of one frame capacity and, at the same time, to a delay 118 which holds the data until five sync blocks of one sharing group are stored. The substitution memory 114 having a structure similar to memory 108 shown in FIG. 6 sequentially receives the errorless sync blocks of one frame, and overwrites them on the old data. Thus, in the substitution memory 114, updated errorless sync blocks of one frame are stored.

For example, as shown in FIG. 8a, when the new data 1n, 2n, 3n, 4n and 5n of one sharing group just received from memory 108 are all errorless sync blocks, they are transmitted as they are to further stage, such as to circuit 122.

When the error flag is "1" indicating that the corresponding sync block has some errors, switches 110 and 112 are switched to terminal C. In this case, the error sync block along line L1 diminishes at the terminal T, and in turn, the substitution memory 114 reads a substitute sync block of one previous frame from an area which should be supplied with the new sync block. The substitute sync block is transmitted along line L4 to a concealment flag setting circuit 116 for setting a concealment flag at the first bit of the two front bits in the substitute sync block. The substitute sync block is transmitted along line L5 and switch 110 back to substitution memory 114 for overwriting the substitute sync block with the concealment flag being set and, at the same time, along line L6 and switch 112 to delay 118.

Figure 8B:
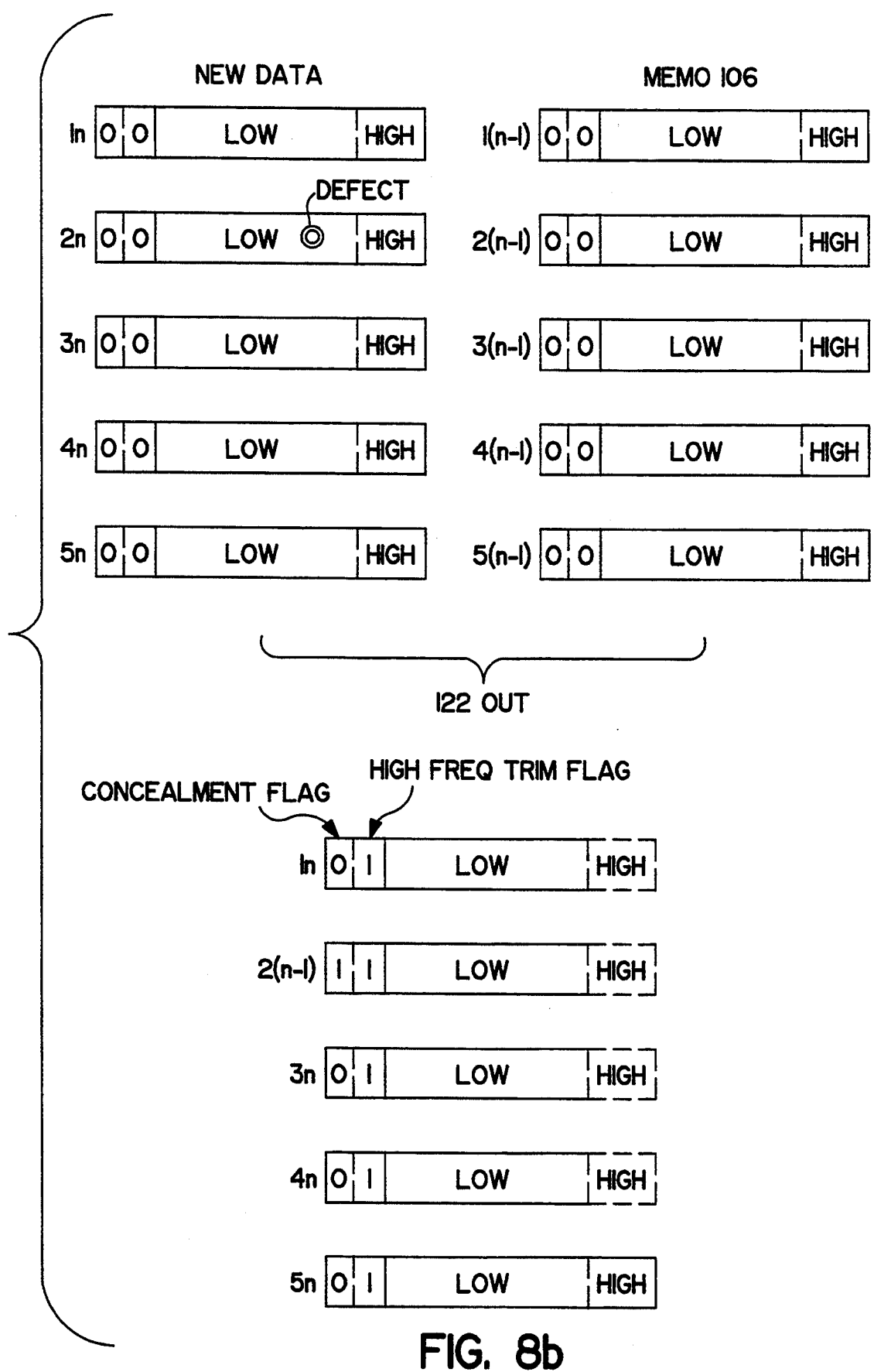

For example, as shown in FIG. 8b, when the new data 1n, 3n, 4n and 5n are errorless sync blocks but new data 2n has a defect remaining therein, switches 110 and 112 are changed to terminal C during a moment for sending the second sync block 2n. Thus, in the stage after the switch 112, the second sync block 2n is replaced with a substitute sync block 2(n−1) from the previous frame as stored in substitution memory. In this case, the concealment flag for the second sync block 2(n−1) is set to "1".

The sync blocks from switch 112 are provided to the delay 118. The delay 118 holds the data until five sync blocks of one sharing group are stored. When five sync blocks of one sharing group are stored, they are sequentially transmitted to a HIGH FREQUENCY TRIM flag setting circuit 122. Then, the delay 118 is reset, ready for receiving next five sync blocks of another sharing group.

The sync blocks from switch 112 are also applied to a concealment flag detector 120 which detects only the concealment flag bit, i.e., the first bit, of the sync blocks. A detail of the concealment flag detector 120 is shown in FIG. 7.

Figure 7:
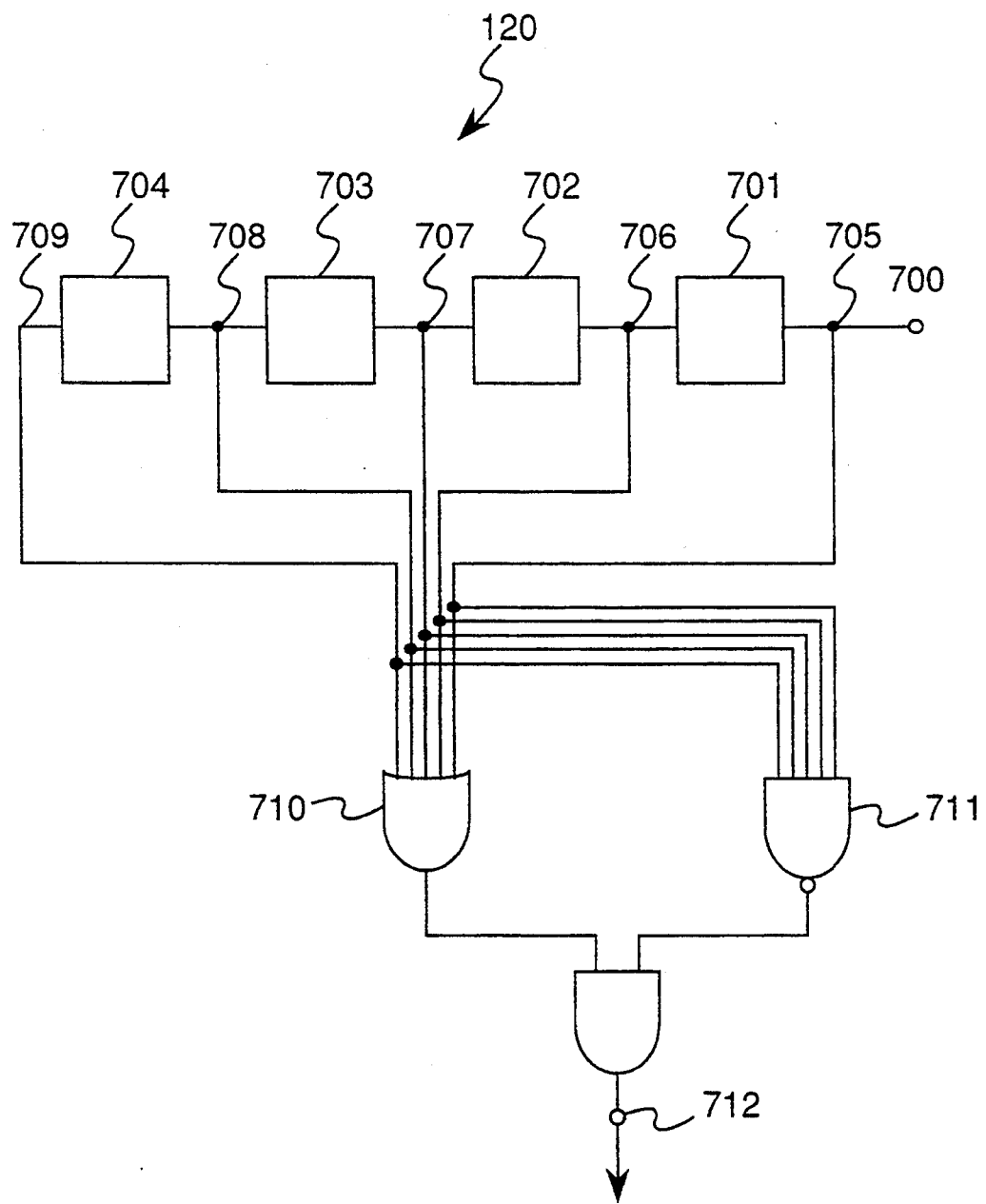
FIG. 7 is a circuit diagram showing a detail of the substitution flag detector 120 used in the circuit of FIG. 1, and FIGS. 8a, 8b and 8c are diagrams showing the steps for processing the sync blocks in the circuit of FIG. 1.

Referring to FIG. 7, the concealment flag detector 120 comprises an input for receiving the concealment flag bit, four shift registers 701, 702, 703 and 704 for producing five subsequent concealment flags including the present concealment flag and the four previous concealment flags, an OR gate 710 for taking an OR of the five subsequent flags, a NAND gate 711 for taking a NAND of the five subsequent flags, and an AND gate 712 for taking an AND between the outputs of the OR gate 710 and NAND gate 711. When the concealment flag detector 120 receives five concealment flags of one sharing group, it is reset and is ready for receiving next five concealment flags of another sharing group. The concealment flag detector 120 detects the following three different situations (i), (ii) and (iii).

(i) When the five concealment flags in one sharing group are all reset (0), OR gate 710 produces "0", and at the same time NAND gate 711 produces "1". Thus, AND gate 712 produces "0" indicating that no substitute sync block is carried in five sync blocks in the sharing group.

(ii) When at least one of the five concealment flags in one sharing group is set (1), but excluding situation (iii), OR gate 710 produces "1", and at the same time NAND gate 711 produces "1". Thus, AND gate 712 produces "1" indicating that at least one substitute sync block is carried in five sync blocks in the sharing group.

(iii) When the five concealment flags in one sharing group are all set (1), OR gate 710 produces "1", and at the same time NAND gate 711 produces "0". Thus, AND gate 712 produces "0" indicating that all of five sync blocks in the sharing group are substituted.

The detected result of the concealment flag detector 120 is applied to HIGH FREQUENCY TRIM (HRT) flag setting circuit 122. When the detected result is "0", corresponding to situations (i) and (iii), the HRT flag setting circuit 122 maintains the second bit position of the five sync blocks in the sharing group in the reset condition (0), as shown in FIGS. 8a and 8c. When the detected result is "1", corresponding to situation (ii), the HRT flag setting circuit 122 sets the second bit position of the five sync blocks in the sharing group to the set condition (1), as shown in FIG. 8b.

A HIGH FREQUENCY TRIM Circuit 124 is coupled with a HIGH FREQUENCY TRIM flag detector 126. When the HRT flag detector 126 detects set HRT flags, such as in the case of FIG. 8b, the HIGH FREQUENCY TRIM circuit 124 is activated to trim or cut off the HIGH FREQUENCY data from the sync block. Since the HRT flags are added to all the five sync blocks in one sharing group that has at least one substitute sync block, all the HIGH FREQUENCY data in the five sync blocks in that sharing group are eliminated. When there is one to four substitute sync blocks in one sharing group, the elimination of the HIGH FREQUENCY data is necessary, as explained below.

The reason for providing the HIGH FREQUENCY TRIM circuit 124 is explained below.

The HIGH FREQUENCY data in the substitute sync block may be shifted to the neighbor sync blocks in the sharing group trying to complete the missing part of the HIGH FREQUENCY data in the neighboring sync blocks. However, since the added HIGH FREQUENCY data will not be the same as the missing data, the reproduced image will be deteriorated very much. Therefore, the HIGH FREQUENCY data in these five sync blocks are cut off.

In the above embodiment, if the low frequency data is less than 60 bytes, the decoding at the bit rate reduction decoder 128 terminates the decoding in response to the 6-th EOB signal.

In the case when all the five sync blocks are substituted by the sync blocks from the previous frame, all the HIGH FREQUENCY data are from the same sharing group. Thus, in this case, it is not necessary to cut off the HIGH FREQUENCY data.

When the HRT flag detector 126 detects reset HRT flags, such as in the case of FIG. 8a or 8c, the HIGH FREQUENCY TRIM circuit 124 is deactivated to transmit the sync blocks without any change.

A bit rate reduction decoder 128 receives the sync blocks from the HIGH FREQUENCY TRIM circuit 124 and carries out the variable length code decoding, inverse quantization, and inverse discrete cosine transfer (IDCT) to reproduce the digital video data.

Therefore, when the five sync blocks with full length are applied to the bit rate reduction decoder 128, the block in the five macro blocks each covering 64 pixels (8 pixels×8 lines) will be reproduced without any change. Thus, every detail of the original digital video data can be reproduced.

When five sync blocks with the HIGH FREQUENCY trimmed are applied, to the bit rate reduction decoder 128, the macro blocks will be reproduced without the HIGH FREQUENCY data. Thus, the reproduced image using only the LOW FREQUENCY data will be somewhat vague in detail, but still has the same outline image as the original digital video data.

The reproducing of the sync blocks using only the LOW FREQUENCY data is disclosed in detail in IEEE Transaction on Consumer Electronics, Vol., 37, No. 3, August 1991, titled "A STUDY ON TRICK PLAYS FOR DIGITAL VCR" by C. YAMAMITSU et al., which is herein incorporated by reference.

In contrast to the present invention, according to the prior art, when at least one sync block with an error data is contained in the five sync blocks of the shared group, all the five sync blocks are substituted, resulting in a great deterioration of the reproduced image.

Therefore, according to the present invention, the number of substituted sync blocks can be minimized, and image deterioration resulting from substitution can be minimized by decoding only the LOW FREQUENCY data of the sync block when one to four sync blocks in one sharing group is substituted by another in the signal processing apparatus according to the present invention. Although block distortion and other image deterioration may occur because the HIGH FREQUENCY data is lost, the resulting visible deterioration in moving image areas is less than that occurring with the loss of block-to-block continuity resulting from substituting a previous block. While there is an extreme increase in the number of sync blocks with errors during high speed playback because the heads trace across plural tracks, it is possible by applying a signal processing apparatus according to the present invention to display as many blocks as possible on screen.

It is to be noted that the present embodiment was described using one frame as the unit of bit rate reduction, but it will be obvious that the invention can also be applied using a unit of one field or of two or more frames for bit rate reduction. When the bit rate reduction unit is two frames or more, however, less deterioration can be achieved by decoding only the low frequency component of the current page rather than substituting blocks from a past page because of the reduced correlation between the current and past page blocks.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A signal processing apparatus for use in a digital video signal reproducing apparatus for reproducing a digital signal presented in sync blocks each having a fixed area for storing low frequency data and an N (N is a positive integer) number of subsequent sync blocks defining a sharing group for sharing storing high frequency data, said signal processing apparatus comprising:

error correction means for correcting errors in said sync blocks;

error flag providing means for providing an error flag to a sync block which still has an error remaining after the processing in said error correction means and for selecting an errorless sync block which has no error;

memory means for storing errorless sync blocks of at least one frame;

substitution means for substituting a sync block stored in said memory means for a sync block having an error flag;

substitution detection means for detecting a presence of at least one to (N−1) substitute sync block in said N sync blocks; and high frequency area trimming means for passing without any change said N sync blocks when no substitute sync block is detected, but for trimming the high frequency data when one to (N−1) substitute sync block is detected by said substitution detection means.

2. A signal processing apparatus as claimed in claim 1, wherein said error correction means comprises an inner correction means for correcting said errors in said sync blocks using an inner correction parity and an outer correction means for correcting said errors in said sync blocks using an outer correction parity.

3. A signal processing apparatus as claimed in claim 1, wherein said N is five.

4. A signal processing apparatus as claimed in claim 1, further comprising a bit rate reduction decoder.

5. A signal processing apparatus as claimed in claim 1, further comprising a bit rate reduction decoding means for decoding sync blocks produced from said high frequency area trimming means.

6. A signal processing apparatus as claimed in claim 5, wherein said bit rate reduction decoding means employs an orthogonal transform.

7. A signal processing apparatus for use in a digital video signal reproducing apparatus for reproducing a digital signal presented in sync blocks each having a low frequency area and a high frequency area and an N (N is a positive integer) number of subsequent sync blocks defining a sharing group for sharing high frequency areas for storing high frequency data, said signal processing apparatus comprising:

error correction means for correcting errors in said sync blocks;

error flag providing means for providing an error flag to a sync block which still has an error remaining after the processing in said error correction means and for selecting an errorless sync block which has no error;

memory means for storing errorless sync blocks of one frame;

substitution means for passing said errorless sync block and for substituting a sync block stored in said memory means for a sync block having an error flag;

holding means for holding said N number of sync blocks produced from said substitution means;

substitution detection means for detecting a presence of at least one to (N−1) substitute sync block in said N sync blocks stored in said holding means; and high frequency area trimming means for passing without any change said N sync blocks produced from said holding means when no substitute sync block is detected, but for trimming the high frequency area from each of said N sync blocks produced from said holding means when one to (N−1) substitute sync block is detected by said substitution detection means.

* * * * *